United States Patent [19]

Tsuchiya et al.

[11] Patent Number: 4,805,059
[45] Date of Patent: Feb. 14, 1989

[54] MAGNETIC HEAD HAVING MNO/NIO-BASED NONMAGNETIC SUBSTRATE

[75] Inventors: Kazuhiro Tsuchiya; Toshikazu Nishiyama; Hiroshi Tomishima, all of Saitama, Japan

[73] Assignee: Hitachi Metals, Ltd., Tokyo, Japan

[21] Appl. No.: 887,184

[22] Filed: Jul. 21, 1986

[30] Foreign Application Priority Data

Jul. 22, 1985 [JP] Japan .................. 60-161660

[51] Int. Cl.$^4$ .................. G11B 5/12; G11B 15/60
[52] U.S. Cl. .................. 360/125; 360/103
[58] Field of Search .................. 360/125–127, 360/110, 118, 122, 121, 103, 102; 156/616, 621

[56] References Cited

U.S. PATENT DOCUMENTS

| 4,264,939 | 4/1981 | Takii et al. | 360/118 |
| 4,402,787 | 9/1983 | Matsuzawa et al. | 156/621 |
| 4,506,308 | 3/1985 | Furuichi et al. | 360/121 |
| 4,521,323 | 6/1985 | Hirota et al. | 360/127 X |
| 4,540,638 | 9/1985 | Sakakihara et al. | 428/693 |
| 4,598,052 | 7/1986 | Wada et al. | 360/122 X |

FOREIGN PATENT DOCUMENTS 5921732 10/1977 Japan .
59-908 1/1984 Japan .

*Primary Examiner*—John H. Wolff
*Attorney, Agent, or Firm*—Finnegan, Henderson, Farabow, Garrett & Dunner

[57] ABSTRACT

A magnetic head having a magnetic alloy film superposed on a nonmagnetic substrate. The nonmagnetic substrate material contains 67 to about 89.9 mol % of MnO, 10 to 33 mol % of NiO, and at least 0.1 mol % but not more than 10 mol % of a material selected from the group of CaO, $ZrO_2$, $V_2O_5$, $Y_2O_3$, and Cu and has a rock salt-type crystalline structure.

17 Claims, 6 Drawing Sheets

MAGNETIC HEAD HAVING MNO/NIO-BASED NONMAGNETIC SUBSTRATE

FIELD OF THE INVENTION AND RELATED ART STATEMENT

This invention relates to a nonmagnetic substrate and a magnetic head.

High-frequency recording magnetic heads such as recording and reproducing magnetic heads for computers, positioning magnetic sensors for VTR tapes, heads for PCM recording tapes, and heads for electronic cameras have been heretofore produced by using ferrites and Sendust. Recently film magnetic heads have come to attract growing attention as promising successors to the conventional heads mentioned above.

As the characteristics which the substrates for such film magnetic heads are required to possess, the following items can be cited.

(A) The substrates should possess thermal expansion coefficients equalling those of metallic magnetic films which are formed on substrates by such known physical evaporation techniques as the vacuum evaporation method, the sputtering method, and the ion plating method.

(B) They should possess flat surfaces and contain pores sparingly.

(C) They should readily admit of precision machining without sustaining cracks or chippings.

Heretofore in the manufacture of film magnetic heads, integrated circuit devices, etc., products obtained by superposing metallic magnetic films on such nonmagnetic substrate materials as barium titanate, calcium titanate, alumina, zinc ferrite, and glass, for example, been heretofore used.

The present patent applicant has introduced improved nonmagnetic materials to the art as disclosed in Japanese Patent Publication SHO No. 56(1981)-21, 732 and Japanese Patent Application Laid-open SHO No. 59(1984)-908. These nonmagnetic substrate materials are subjected to mirror finish machining and then cleaned in such organic solvents as trichloroethylene and acetone. Subsequently, on these substrates, magnetic films of the Fe-Ni type, Fe-Al-Si type, or Co-Nb-Zr type alloy are superposed in thicknesses ranging from several to some tens of $\mu m$ by various known physical evaporation techniques. The composites thus obtained are then subjected to a heat treatment when necessary for the improvement of magnetic properties.

Many of the conventional substrate materials mentioned above (except for those proposed by the present patent applicant as described above) have suffered from a disadvantage that the metallic magnetic films deposited thereon are liable to peel off because their thermal expansion coefficients differ widely from those of the metallic magnetic films. In the case of glass which has a thermal expansion coefficient approximating thermal expansion coefficients of metallic magnetic films, for example, the problem of peeled deposited films is absent. When a film head is produced using a glass substrate, however, this film head has suffered from a disadvantage that it is liable to be worn by friction against a magnetic recording medium because glass by nature has low rigidity.

The aforementioned materials proposed by the present applicant overcome this problem. As a result of a continued study, the inventor has found that these materials, during precision machining, cause heavy wear of cutting blades and possibly sustain cracks and chippings easily.

Thus, the desirability of a nonmagnetic substrate material which has a thermal expansion coefficient approximating the thermal expansion coefficients of metallic magnetic films (120 to $150 \times 10^{-7}/°C.$), causes abrasion of a cutting blade sparingly during precision machining, and does not easily sustain cracks and chippings has found growing recognition.

OBJECT AND SUMMARY OF THE INVENTION

The first object of this invention is to provide a nonmagnetic substrate highly suitable for superposition thereon of a metallic magnetic film by the physical evaporation method and a magnetic head using the substrate.

The second object of this invention is to provide a nonmagnetic substrate which is a homogeneous sintered substrate having a thermal expansion coefficient approximating thermal expansion coefficients of alloy magnetic films, enjoying absence of pores, and excelling in cutting and grinding properties.

The third object of this invention is to provide a magnetic head which, during the course of its manufacture, can be efficiently cut and ground without sustaining cracks and chippings.

The fourth object of this invention is to provide a magnetic head which, while undergoing precision machining, sparingly causes abrasion of a cutting blade being used in the machining.

The fifth object of this invention is to provide a magnetic head which, during the course of a heat treatment, has no possibility of suffering separation of an alloy magnetic film deposited thereon.

The sixth object of this invention, therefore, is to provide a magnetic head which can be manufactured easily.

The seventh object of this invention is to provide a magnetic head which excels in magnetic properties.

These objects described above are accomplished by the nonmagnetic substrate material of the present invention which contains 67 to 90 mol % of MnO, 10 to 33 mol % of NiO, and not more than 10 mol % of at least one member selected from the group consisting of CaO, $ZrO_2$, $V_2O_5$, $Y_2O_3$, and CuO and possesses a rock salt crystalline structure. The content of the additives is at least 0.1 mol %, preferably more than 0.5 mol %.

The present invention also provides a magnetic head which possesses a nonmagnetic substrate of the material mentioned above and which has a magnetic substrate of the material mentioned above and which has a magnetic alloy film superposed on the substrate.

DETAILED DESCRIPTION OF PREFERRED EMBODIMENTS

The nonmagnetic material of the present invention contains 67 to 90 mol % of MnO, 10 to 33 mol % of NiO, and not more than 10 mol % of at least one member selected from the group consisting of CaO, $ZrO_2$, $V_2O_5$, $Y_2O_3$, and CuO. (Each % shows mol % hereunder unless specific instruction is provided).

This invention fixes the lower limit of the content of MnO as the main component at 67% because the material satisfying this requirement has amply low rigidity and excellent cutting and grinding properties. (Specifically, the abrasion of a cutting blade and the resistance to cutting are greatly decreased as will be described fully afterward.) The reason for fixing the upper limit of the MnO content at 90% is that the sintering property of the material is insufficient and the amount of pores contained in the material is excessively large when the MnO content exceeds 90%.

Figure 8:
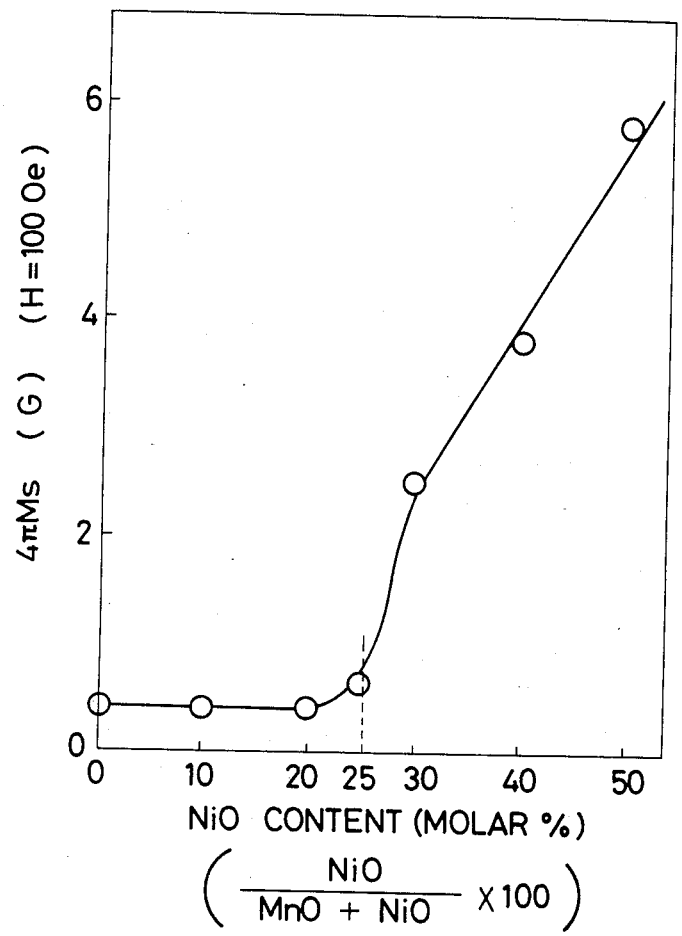

When the NiO content is not more than 25 mol %, the nonmagnetic material exhibits very low saturation magnetization as shown in FIG. 8 and, therefore, manifests excellent performance.

CaO, $ZrO_2$, $V_2O_5$, $Y_2O_3$, and CuO (hereinafter referred to occasionally as "CaO, etc.") invariably serve to enhance the sintering property of the material and decrease the amount of pores which occur in the material.

If the content of CaO, etc. is larger than 10%, the material has increased rigidity and lowered cutting and grinding properties. Thus, the addition of CaO, etc. is desired to be made in an amount of not more than 10%, preferably not more than 6%. It is optional to add just one member or two or more members from the aforementioned group of CaO, etc.

When just one member of the group is to be used, CaO proves to be the most desirable choice because (1) the action of increasing rigidity is not very strong, (2) the action of promoting sintering is strong, (3) the solubility in water is nil, and (4) the possibility of the material shedding particles during the course of cutting is very remote.

Combined addition of CaO and $ZrO_2$ proves more desirable than the sole addition of CaO or $ZrO_2$ because the degree of increasing the rigidity of the material is small, the sintering property is high, and the amount of pores is small.

If the amount of the additives is less than 0.1%, the sintering property of the material is degraded. When the amount is more than 0.5%, the amount of pores is reduced.

The material of this invention which has its composition in the range specified above possesses a thermal expansion coefficient closely approximating thermal expansion coefficients of magnetic films of the Fe-Ni type and Fe-Al-Si type alloys (120 to $150 \times 10^{-7}/°C.$). It is substantially nonmagnetic.

This invention defines the nonmagnetic material as possessing a rock salt type crystalline structure for the following reasons. Although the material of the composition contemplated by this invention could assume a Spinel type crystalline structure, this invention requires the material to assume the rock salt type crystalline structure so that:

(1) The thermal expansion coefficient will approximate that of the magnetic alloy film.
(2) The occurrence of pores will be curbed.

The nonmagnetic material of this inveniton can be produced by the conventional method. For example, the raw materials such as oxide, carbonate, nitrate, hydroxide, and alcoholate are weighed out in a prescribed ratio and then thoroughly mixed with a suitable solvent such as water, alcohol, or acetone in a ball mill, for example. The resulting wet mixture is dried and calcined. Then, the calcined mixture is crushed, molded in a prescribed shape, and sintered. The burning is desired to be carried out in a nonoxidative atmosphere such as vacuum, nitrogen, or argon, for example. For the sintered material to acquire a thoroughly packed texture, the treatment with a hot hydrostatic press (HIP) proves to be a desirable recourse.

Now, the construction of the magnetic head contemplated by the present invention will be described below.

Figure 1:
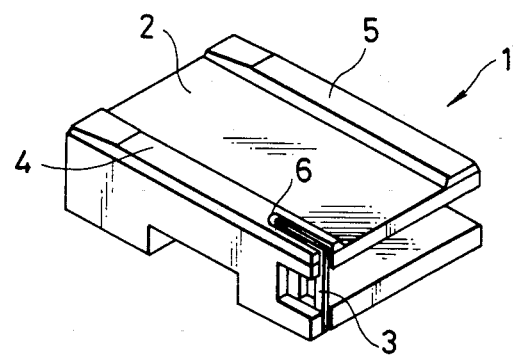
FIG. 1 is a perspected view of a magnetic head in accordance with an embodiment of the present invention.

FIG. 1 is a schematic diagram of a typical magnetic head embodying the present invention. A magnetic head 1 comprises a nonmagnetic slider 2 and a chip 3. The chip 3 is inserted in a slit 6 which is formed in an air bearing surface 4 which constitutes one of a pair of air bearing surfaces 4, 5 of the slider 2 and fixed in position by being molded with glass, for example.

Figure 2:
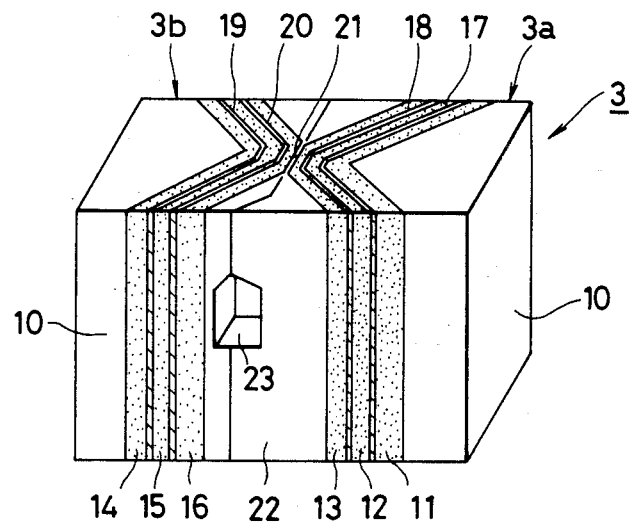
FIG. 2 is an enlarged view of a part of FIG. 1.

The construction of one example of this chip 2 is illustrated in detail in FIG. 2. As illustrated in FIG. 2, this chip 3 is formed by combining two halves 3a, 3b. These halves are each provided with a nonmagnetic substrate 10 and a magnetic alloy layer formed on the nonmagnetic substrate 10. To be more specific, sputtered films are formed on the nonmagnetic substrates 10. These sputtered films are formed in such a structure that magnetic alloy layers 11–13 and 14–16 and insulation layers 17–18 and 19–20 are alternately superposed. The pair of chip halves 3a, 3b are joined to each other with glass on the surfaces of the magnetic alloy layers 13 and 16 in such a manner as to be provided with a gap 21. Numeral 22 stands for the glass joint. A prescribed winding is applied to a winding window 23.

The nonmagnetic substrate 10 is made of the nonmagnetic material contemplated by this invention. The composition and other factors of the material have already been described.

The composition of the sputtered films is not specifically defined. Any of the various compositions heretofore adopted in the art can be used. As desirable examples, the composition of 3 to 7% of Al, 7 to 11% of Si, and 82 to 90% of Fe in weight % proposed by the present applicant in Japanese Patent Application SHO No. 60(1985)-40,876 and the composition of 4.5 to 6.5% of Al, 9.8 to 10.5% of Si, and 85 to 87% of Fe formulated for the purpose of obtaining high permeability may be cited.

Since the electrical resistance of the sputtered film is so small as to fall in the range of several $\mu\Omega.cm$ to some hundreds of $\mu\Omega.cm$, the permeability is lowered by eddy current loss unless the thickness of the film is decreased to a certain extent. Thus, the sputtered film is desired to thinner than the skin depth. Conversely if the thickness of the sputtered film is too small, however, there ensues a disadvantage that the ratio of the volume of the metal films to that of the intermediate layers for interlayer insulation becomes small and the permeability of the entire chip becomes insufficient. From the foregoing point of view, the desirable thickness of the sputtered film is in the range of 0.5 to 30 $\mu m$, preferably 3 to 15 $\mu m$.

For the purpose of improving the frequency characteristic of permeability, it is desirable to have sputtered films formed in a multiplicity of layers. In this case, the adjacent magnetic alloy layers are separated by having insulation layers of silicon oxide, for example, interposed on each therebetween. The magnetic alloy layers each have a thickness in the range of 0.5 to 10 $\mu m$, preferably 3 to 10 $\mu m$. When the thickness of the insulation layers is not more than 1/20 of the thickness of the magnetic alloy layers, the magnetic resistance is amply small. When this thickness is not less than 0.02 μm, the insulation layers provide ample insulation. Generally, the thickness of the insulation layers is in the range of 0.02 to 1.0 μm, preferably 0.2 to 0.7 μm. In FIG. 2, sputtered films possessing three magnetic alloy layers are illustrated. The number of such magnetic alloy layers may be decreased to 2 or increased to 4 or even more to suit the occasion.

The sputtered films can be formed under the sputtering conditions used conventionally.

A target material differs slightly in composition from the sputtered film. This difference in composition is also varied by the sputtering conditions such as the argon pressure and the distance separating electrodes. The sputtered film of a desired composition, therefore, can be easily obtained by suitably changing the composition of the target and the sputtering conditions.

The magnetic head which has magnetic alloy films formed therein by sputtering is desired to be subjected to a heat treatment for the purpose of enhancing permeability. This heat treatment is carried out in a vacuum or in an inert gas at a temperature desirably in the range of 400° to 900° C., preferably 500° to 700° C., for a period of 0.3 to 2 hours, preferably 0.5 to 1 hour. This heat treatment may be performed simultaneously with the formation of the glass joint. In consequence of this heat treatment, the crystal grains of the magnetic alloy film gain in growth. When the crystal grains exceed 0.3 μm in diameter, the permeability is improved. If the diameter exceeds 1.0 μm, however, while the permeability is improved, the film during the course of fabrication, sustains peelings and cracks and does not withstand precision machining. The suitable size of the crystal grains, therefore, is in the range of 0.3 to 1.0 μm.

EXAMPLE 1

Commercially available $MnCO_3$, NiO, and $CaCO_3$ invariably of special grade chemical where weighted in varying proportion calculated to give MnO:NiO:CaO molar ratios of 100:0:1, 90:10:1, 80:20:1, 70:30:1, and 60:40:1. Each of the resulting mixtures was comminuted in a ball mill in the presence of pure water for 24 hours. The resulting slurry was calcined in a $N_2$ atmosphere at 900° C. for 4 hours. The calcined mixture was molded in the shape of a block 33 mm×40 mm×14 mm under pressure of 3 tons/cm². The block was subjected to primary burning (in a $N_2$ atmosphere at 1,330° C. for 6 hours) and then to a HIP treatment under 1,000 atmospheres at 1,200° C. for 1 hour (in an Ar atmosphere).

The sintered blocks were analyzed by X-ray diffraction. The results indicate that they invariably possessed a rock salt type crystalline structure.

Figure 3:
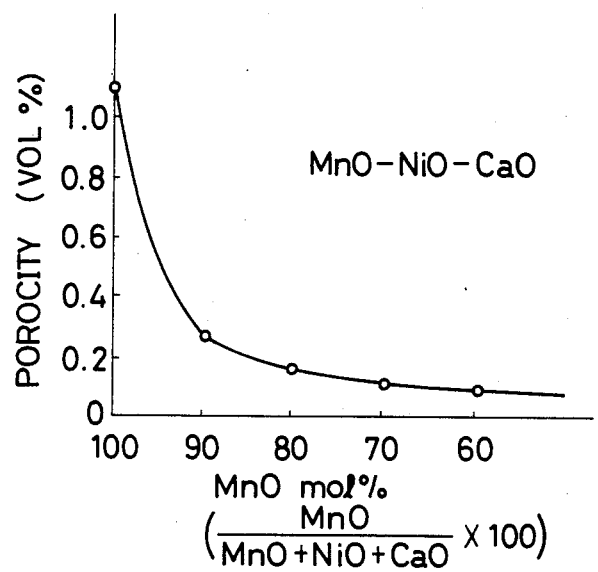
FIGs. 3 to 8 are each graphs which show results measured in Examples.
Figure 4:
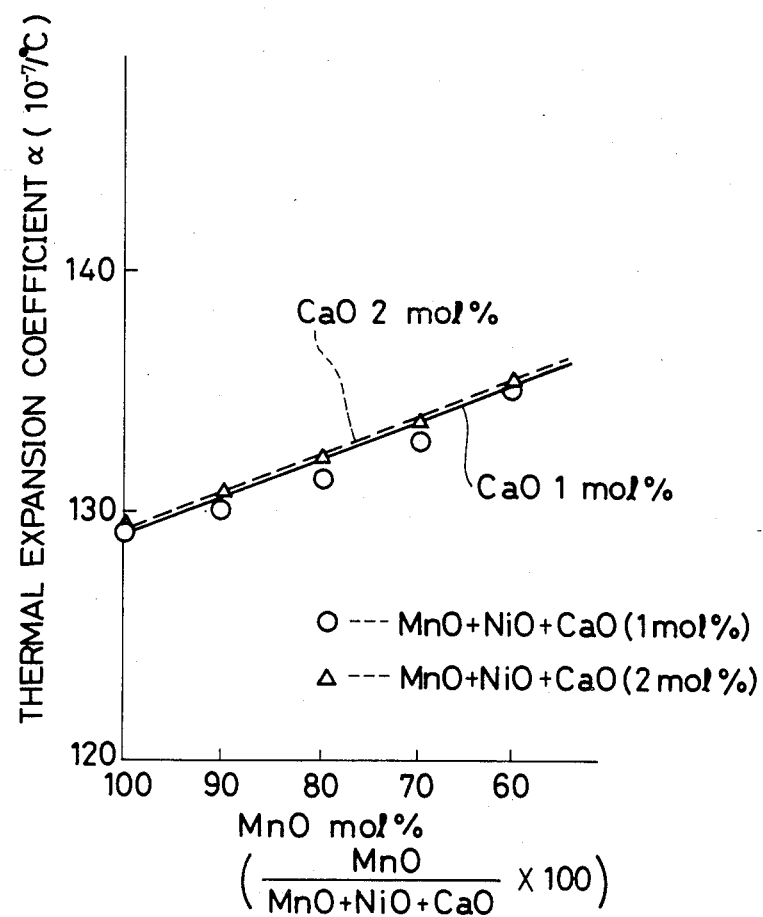

The sintered blocks were tested for porosity and thermal expansion coefficient. The results are shown in FIG. 3 and FIG. 4. The porosity was determined by mirror finishing the surface of a given sintered block, photographed the finished surface by a scanning electron microscope (2,000 magnifications), and measuring the diameters of sample pores and taking count of such pores.

It is noted from FIG. 3 that the pore content conspicuously increased when the MnO content exceeded 90% and the tightness of texture was sifficient when the MnO content was in the range of 66 to 90%.

From FIG. 4, it is noted that the thermal expansion coefficients of the sintered blocks fell in the range of 130 to $140 \times 10^{-6}$, the values substantially agreeing with that of magnetic alloy film.

In FIG. 4, the thermal expansion coefficients obtained of the MnO-NiO-CaO type materials (CaO added in 2%) as described afterward are also shown.

EXAMPLE 2

Sintered blocks were obtained by following the procedure of Example 1, except that a commerically available $CaCO_3$ of special grade chemical was additionally incorporated to give MnO:NiO:CaO molar ratios of 70:30:(2, 4, or 6). The produced sintered blocks were tested for porosity. The results are shown in FIG. 5.

EXAMPLE 3

Sintered blocks were obtained by following the procedure of Example 2, except that Zr, V, Y, and Cu oxides were used in the place of $CaCO_3$. The produced sintered blocks were tested for porosity. The results are shown in FIG. 5.

Figure 5:
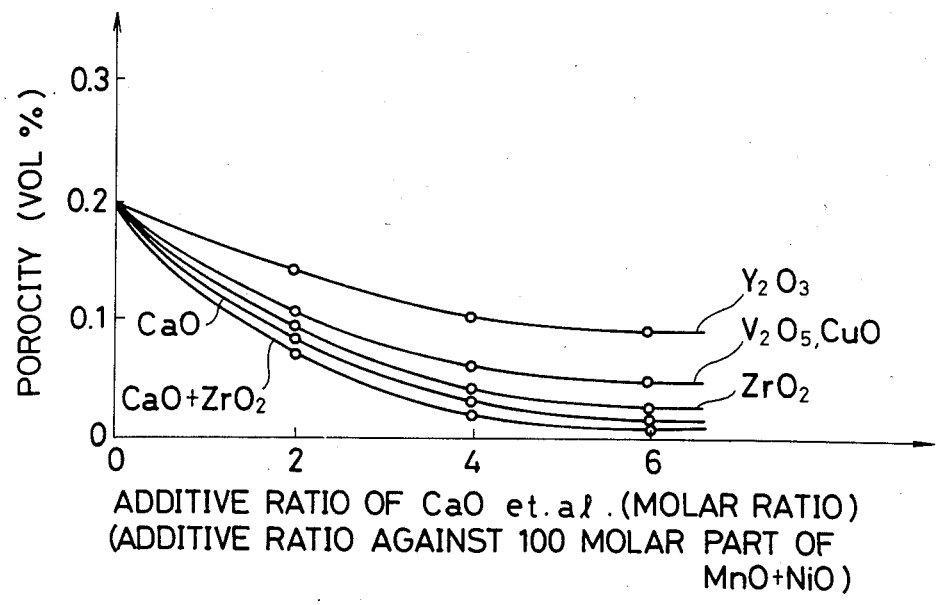

It is noted from FIG. 5 that CaO, $ZrO_2$, $Y_2O_3$, $V_2O_5$, and CuO promoted the sintering of the MnO-NiO type oxides.

EXAMPLE 4

Sintered blocks were obtained by following the procedure of Example 2, except that an equimolar mixture of $CaCO_3$ and $ZrO_2$ was used in the place of $CaCO_3$. When the produced sintered blocks were tested for porosity, it was found that the they possessed lower degrees of porosity than the sintered blocks of Example 2 using $CaCO_3$ alone.

The sintered blocks obtained by incorporating $CaCO_3$ (Example 2) and the sintered blocks obtained by incorporating an equimolar mixture of $CaCO_3$ and $ZrO_2$ (Example 4) were tested for Vickers hardness. The results are shown in FIG. 6.

Figure 6:
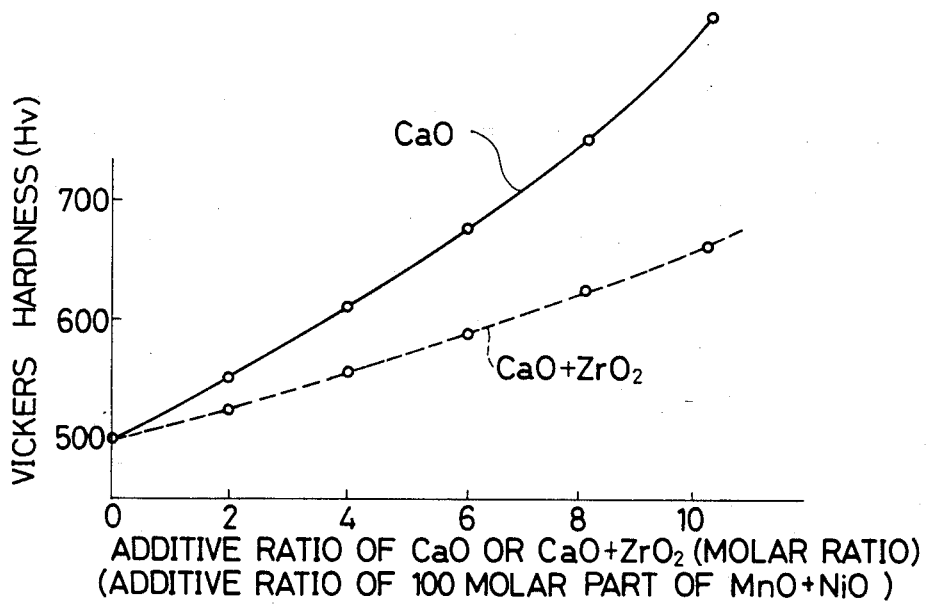

It is noted from FIG. 6 that Vickers hardness increased and the ease of cutting work decreased in proportion as the content of CaO or that of CaO+$ZrO_2$ increased and that the increase of Vickers hardness was quite conspicuous when the content exceeded 10 mol %. It is further noted that the mixture of CaO+$ZrO_2$ was less effective in increasing Vickers hardness than CaO used alone. It is also noted that in the case of the sole addition of CaO, the increase of Vickers hardness was not very conspicuous when the CaO content was not more than 6%.

EXAMPLE 5

Sintered blocks were obtained by following the procedures of Examples 1–4, except that the dimensions of the blocks were changed to 10 mm×20 mm×2 mm. One surface of each of the sintered blocks was mirror finished. On the finished surface, a Fe-Ni type metallic magnetic film (Permalloy film) or a Fe-Al-Si type metallic magnetic film (Sendust film) was formed in a thickness of about 5 μm. The resulting composite was heat treated by being kept under a vacuum at 600° C. for 10 minutes and then left undergoing furnace cooling.

For comparison, substrates of barium titanate were prepared and treated as conventional materials by the same procedure as described above. In the conventional materials, Permalloy films and Sendust films were both peeled during the course of heat treatment. In the materials of this invention, such films were not found to separate from the blocks.

EXAMPLE 6

Figure 7:
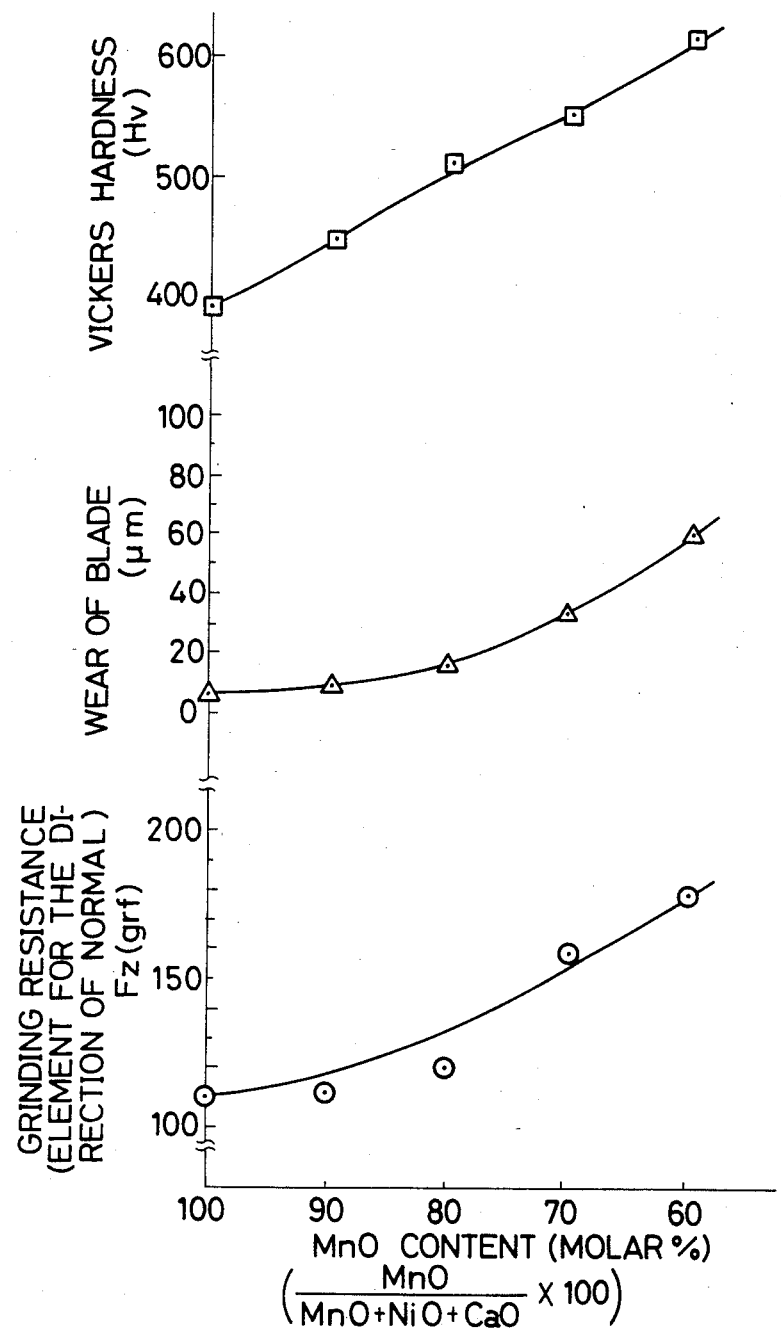

Sintered blocks having MnO:NiO:CaO compositions in molar ratios of 60:40:2 (comparative experiment), 70:30:2, 80:20:2, 90:10:2, and 100:0:2 (comparative experiment) were obtained by faithfully following the procedures of the examples cited above. They were ground with a diamond grindstone. Data on grinding resistance and wear of cutting blade are shown in FIG. 7. The grinding conditions were as follows.

Blade: Diamond grindstone with resin bond (grain size #1000, thickness 0.2 mm, diameter 50 mm)
Rotational speed of blade: 2,500 rpm
Cutting depth: 0.3 mm
Cutting length: Total 600 mm (Cutting of 20 mm length was repeated for 30 times)

In FIG. 7, the results of test for Vickers hardness are also shown.

It is noted from FIG. 7 that Vickers hardness decreased and grinding resistance and wear of cutting blade both decreased in proportion as the MnO content increased.

The sintered blocks obtained in Example 6 were tested for (4 $\pi$Ms) in a magnetic field of 100 Oe. The results were as shown in FIG. 8. It is noted from FIG. 8 that the sintered blocks having NiO contents of not more than 25 mol % exhibited extremely low saturation magnetizations even not exceeding 0.4 G and proved themselves to be highly suitable nonmagnetic materials. The materials obtained in Examples 1-5 were also tested for saturation magnetization at 100 Oe. The results indicate that they were nonmagnetic. Some of the results are shown in Table 1.

TABLE 1

| MnO:NiO:CaO:ZrO$_2$ (Molar ratio) | Saturation magnetization (G) |
| --- | --- |
| 70:30:0:0 | 0.8 |
| 70:30:2:0 | 2.5 |
| 70:30:2:2 | 0.5 |

We claim:

1. A magnetic head having a magnetic alloy film superposed on a nonmagnetic substrate, said nonmagnetic substrate comprising 67 to about 89.9 mol % of MnO, 10 to about 32.9 mol % of NiO, and at least about 0.1 mol % but not more than 10 mol % of at least one material selected from the group consisting of CaO, ZrO$_2$, V$_2$O$_5$, Y$_2$O$_3$, and CuO and having a rock salt type crystalline structure.

2. The magnetic head according to claim 1, wherein the content of the at least one material selected from the group consisting of CaO, ZrO$_2$, V$_2$O$_5$, Y$_2$O$_3$, and CuO is not more than 6 mol %.

3. The magnetic head according to claim 1 wherein said nonmagnetic substrate has a thermal expansion coefficient in the range of $120 \times 10^{-7}$ to $150 \times 10^{-7}$/°C.

4. The magnetic head according to claim 1, wherein said nonmagnetic substrate consists essentially of 67 to about 89.9 mol % of MnO, 10 to about 32.9 mol % of NiO, and at least 0.1 mol % but not more than 10 mol % of CaO.

5. The magnetic head according to claim 1, wherein said nonmagnetic substrate consists essentially of 67 to about 89.9 mol % of MnO, 10 to about 32.9 mol % of NiO, and a total of at least 0.1 mol % but not more than 10 mol % of CaO and ZrO$_2$.

6. The magnetic head according to claim 1, wherein said magnetic alloy film is formed by sputtering.

7. The magnetic head according to claim 6, wherein said sputtered film comprises, in weight %, 3 to 7% of Al, 7 to 11% of Si, and 82 to 90% of Fe.

8. The magnetic head according to claim 6, wherein said sputtered film comprises, in weight %, 4.5 to 6.5% of Al, 9.8 to 10.5% of Si, and 83 to 87% of Fe.

9. The magnetic head according to claim 6, wherein said sputtered film has a thickness in the range of 0.5 to 30 $\mu$m.

10. The magnetic head according to claim 6, wherein said sputtered film is formed in a plurality of layers.

11. The magnetic head according to claim 10, wherein said sputtered film has a thickness in the range of 0.5 to 10 $\mu$m per layer.

12. The magnetic head according to claim 10, wherein insulation layers are interposed between each of said plurality of sputtered layers.

13. The magnetic head according to claim 12, wherein said insulation layers each have a thickness in the range of 0.02 to 1.0 $\mu$m.

14. The magnetic head according to claim 6, wherein said magnetic alloy film formed by sputtering is heat treated so as to have particle diameters in the range of 0.3 to 1.0 $\mu$m.

15. The magnetic head according to claim 1, wherein said magnetic head comprises
a slider provided with a plurality of air bearing surfaces furnished with a slit for admitting a slit, and
a slit provided with said nonmagnetic substrate and said magnetic alloy film formed on said nonmagnetic substrate and inserted fast in said slit of said slider.

16. The magnetic head according to claim 15, wherein said chip is composed by having two chip halves joined to each other through the medium of an intervening glass piece adapted to open a window hole therebetween for passage of a winding.

17. The magnetic head according to claim 11, wherein said chip halves are each provided with a nonmagnetic substrate and a magnetic alloy layer superposed on said nonmagnetic substrate

* * * * *